United States Patent Office 3,379,538
Patented Apr. 23, 1968

3,379,538
TREATMENT OF DRIED FRUIT AND VEGETABLE
POWDERS TO PREVENT FOAM FORMATION
DURING RECONSTITUTION
Robert E. Berry and Owen W. Bissett, Winter Haven,
Charles J. Wagner, Jr., Auburndale, and Matthew K.
Veldhuis, Winter Haven, Fla., assignors to the United
States of America as represented by the Secretary of
Agriculture
No Drawing. Filed Aug. 10, 1964, Ser. No. 388,733
23 Claims. (Cl. 99—199)

ABSTRACT OF THE DISCLOSURE

A vacuum treatment for "foam-mat" dehydrated food materials, ranging from about 1 mm. to about 5 mm. Hg absolute pressure, which treatment by virtue of effective removal of occluded air bubbles prevents the formation of air sols and the related cloudy or milky appearance characteristic of materials reconstituted without benefit of the vacuum treatment.

A non-exclusive, irrevocable, royalty-free license in the invention herein described, throughout the world for all purposes of the United States Government with the power to grant sublicenses for such purposes, is hereby granted to the Government of the United States of America.

This invention relates to a process employing foaming agents for producing dried fruit or vegetable powders which upon reconstitution are characterized by their excellent color, their fragrance, their flavor, and their freedom from "air sols" and surface foam.

As used herein, the term "powder" includes dehydrated chunks, spaghetti-like sticks, granules, flakes, ribbons, pulverized particles, and the like. Because of its wide usage in the trade, the term "powder" will be used frequently below as illustrative of these dehydrated products. The term "reconstitution," as used herein, relates to the conversion of the dehydrated products into a fluid comprising water. The reconstituted aqueous product may be a juice, a concentrate, or a puree, and may be derived from natural, commercially-available fruits and/or vegetables.

Many methods have been suggested for drying fruit and vegetable juices. One of these, described as the "foam-mat process," is described in United States Patent 2,967,109. Another is the so-called "puff" drying (or vacuum) process; and a third is the so-called "freeze-drying" process. Some of these require special treatments to enable a sufficiently thorough removal of moisture from the final powder. The foam-mat process which has been frequently used gives the best results when a foaming agent or other substance of a similar nature is used. The use of these foaming agents causes the formation of extremely small (microscopic bubbles which produce a large surface and permit rapid and more complete drying. Certain physical treatments of the liquid also permit the formation of fine-bubble structures. Treatments to form these fine-bubble structures have several advantages, including the removal of moisture to a more complete degree under less severe conditions of time and temperature. This permits the retention of more flavor and aromatic character to certain juices, particularly fruit juices, and permits the preparation of powders having a high degree of storage stability. However, the powders thus produced often contain incorporated microscopic air bubbles. Upon reconstitution of these powders, these microscopic air bubbles cause the formation of "air sols" or colloidal dispersions of these air bubbles dispersed throughout the solution. These bubbles impart to the reconstituted juice an unnatural, white, cloudy or milky appearance. After the reconstituted product stands a very short time, this "air sol" rises and collects on the surface as a dense layer of foam. The presence of this milky appearance and particularly the presence of the foam are detrimental to the physical appearance of many reconstituted products and adversely affect their commercial acceptance.

It is a prime object of this invention to employ these valuable foaming agents for the formation of fine-bubble structures and the exploitation of the related advantages of more thorough and complete moisture removal without physical degradation of the dried products, and of the products reconstituted therefrom.

The formation of foams following the reconstitution of dried fruit and vegetable juice powders has been controlled to some extent through the use of pressure and heat, sometimes referred to as the "warm-rolling" technique, a procedure described in U.S. Patent 3,093,488. This technique is effective in the alleviation of these "air sols" and foams upon reconstitution of certain types of powders; however, this technique has not been effective in providing an improvement of the appearance of liquids reconstituted from powders prepared from foam-mats having air bubbles of extreme microscopic size; further, certain types of the most effective foaming agents have not been usable. This appears to be due to the inefficiency of the "warm-rolling" treatment in eliminating the minute microscopic air bubbles. Consequently, it will be seen that there is a need for a process for preparing powders from fruits and vegetables which upon reconstitution, produce commercially-acceptable products free of "air sols" and/or surface foams.

In accordance with this invention, the disadvantages outlined above are avoided by a procedure which basically involves the following steps:

(1) The dried pieces are first prepared by one of the common "foam-mat" processes.

(2) The minute air bubbles contained therein are then removed by the application of a high vacuum. The length of time required to permit the diffusion of the gases from the dried pieces to a point of equilibrium is dependent not only upon the size of the pieces but also upon the extent of the vacuum applied, and, of course, may be readily determined by those skilled in the art.

(3) After the absorbed gases have been removed by the vacuum treatment, the vacuum may be retained by sealing the container; or the vacuum may be released by means of a nontoxic water-soluble gas, such as carbon dioxide, and the tendency to foam upon reconstitution will still be inhibited. This was unexpected.

It is an advantage of our novel process that the above treatments may be applied to products which have been dried by any of the prior art methods. It is a further advantage of our novel process that the above treatments may be applied to products which have been dried and subsequently treated by the "warm-rolling" technique wherein the surface of the product is melted and squeezed by the warm rollers to drive out part of the entrapped gases.

In another embodiment of this invention, the dried product may be ground to pass a 35-mesh screen before being subjected to warm-rolling, thereby causing a further considerable portion of the entrapped gases to be removed.

It is a still further advantage that the above procedures may be used in various combinations, and may be applied to dried or instant foods of many types, including soups and coffee.

Typical fruits are oranges, lemons, grapefruit, pineapples, apples, tomatoes, prunes, and berries, etc. Typical vegetables are carrots, beans, soya beans, potatoes, sweet-potatoes, and the like. Typical protein products are chicken, mutton, beef, pork, fish, milk, etc. Fruit powders may be reconstituted as juices or concentrates. Vegetables and protein powders may be reconstituted as soups or purees.

In general, in carrying out the process of the invention, a microscopic air bubble-containing dehydrated food product, prepared by a foam-mat process, is deposited into an open container. The food product may be subjected to a warm-rolling treatment prior to being deposited into the container, and may be in the form of a powder, flake or granule. When a powder is used, the particle size ranges from about 0.015 to 0.025 inch.

The open container with its contents is then subjected to a vacuum ranging from about one mm. to about five mm. Hg absolute pressure, and the vacuum maintained until a state of equilibrium is obtained, but not exceeding 72 hours.

The container may then be directly sealed to maintain said equilibrium, or, as an alternative, the vacuum may be released with a water soluble gas, such as carbon dioxide, sulfur dioxide, nitrous oxide, and ethylene oxide to give an absolute pressure ranging from about 38 cm. Hg to about 760 mm. Hg, and the container then sealed to maintain the equilibrium.

Thereafter, the sealed container is reopened, and an aqueous fluid which may be a juice, concentrate, or puree, is reconstituted from the resulting dehydrated product.

The invention is further demonstrated by the following illustrative examples:

Example 1

In the following example a concentrated orange juice is dried by the foam-mat process in which a 95% glyceryl monostearate is used as the foaming agent. A portion of the dried powder (product) is then reconstituted to give a liquid comprising the ingredients of freshly prepared juice from tree-ripened oranges.

The resultant juice has a milky appearance and, after a period of time, a substantial layer of foam forms on the surface making this reconstituted juice commercially unacceptable.

Example 2

Another portion of the dried product of Example 1 is treated by the warm-rolling process of U.S. Patent 3,093,488 after which a portion of the dried product is reconstituted. The resultant fluid product also has a milky appearance but the formation of foam is less than in Example 1. This reconstituted product likewise is not commercially acceptable.

Example 3

In this example a portion of the dried product of Example 1 is finely ground and the portion that passed through a 35-mesh screen is subjected to a warm-rolling process as in Example 2.

The reconstituted product has a slightly milky appearance and some foam forms after a period of time but the reconstituted product is superior to that of Example 2.

Example 4

Three portions of the dried product of Example 2 (treated by the warm-rolling process) are placed under vacuum (one mm. Hg absolute pressure) for 24, 48, and 72 hours, respectively.

Each of the three samples shows a noticeable improvement in the appearance of the reconstituted juice and the reconstituted juice from the 72 hours sample closely resembles the juice from a reconstituted concentrate. These reconstituted products are commercially acceptable and are clearly superior to a juice reconstituted from a powder which has been packed under nitrogen gas. There is a distinct improvement in appearance as the time under vacuum increases up to 72 hours.

Example 5

In the following example, warm-rolled grapefruit powder was prepared by the foam-mat process using 95% glyceryl monostearate. Several portions of the grapefruit powder were treated as follows:

(a) Control samples were canned with air at atmospheric pressure,
(b) Some cans of powder were prepared by evacuating to one mm. Hg absolute pressure, releasing to atmospheric pressure with nitrogen, re-evacuating to 1 mm. Hg absolute pressure, releasing to 38 cm. Hg absolute pressure with nitrogen, then closing the can,
(c) Some samples were prepared by evacuating to one mm. Hg absolute pressure, then closing the cans.

All samples were held at 70° F. for 72 hours, reconstituted, and then compared for overall appearance and the amount of time required to form a definite, characteristic foam layer.

The control sample had a white foamy scum immediately, and a distinct foam layer about ½ inch thick formed at the top of the liquid in ten minutes. The general appearance of this sample was white and very milky and was commercially unacceptable.

The samples canned under 38 cm. nitrogen were considerably better. The milky appearance was not quite as noticeable, and the ½-inch foam layer required about 27 minutes to form.

The sample packed under one mm. Hg absolute pressure was better in appearance and looked much like reconstituted grapefruit concentrate. Very little white scum was apparent and after one hour a foam layer was barely beginning to form. This product was commercially acceptable.

Example 6

The procedures of Example 5 were repeated with another sample of grapefruit powder and, after reconstitution, generally similar results were obtained.

Example 7

In this example another series of experiments was conducted with two warm-rolled grapefruit powders and one orange powder. Cans of all three powders were packed under an absolute pressure of one mm. Hg and stored at 70° F. for two weeks. Some cans of each power were then repacked with nitrogen at atmospheric pressure and held for an additional week at 70° F.

When the samples that had been maintained under vacuum were reconstituted no air-sol was present, very little scum formed, and the products were commercially acceptable.

However, the samples that had been repacked in nitrogen were milky in appearance, a layer of foam formed rapidly, and the products were not commercially acceptable.

This indicates that evacuated samples can not be repacked under nitrogen and maintained in storage without reabsorption of nitrogen gas by the dried product. This makes these samples commercially unacceptable.

Example 8

In this example portions of dried grapefruit powder were degased under vacuum as described before at an absolute pressure of about one mm. Hg for a period of three days. The vacuum was then released with carbon dioxide gas, and the powder repackaged under carbon dioxide at atmospheric pressure and stored at 70° F. for seven days. When reconstituted, the juice was as good, or better, in appearance than juice reconstituted from powder held under vacuum continuously. In addition, the powders seemed to reconstitute more readily than those held under vacuum. These powders were commercially acceptable.

When the vacuum is released with carbon dioxide gas, and the powder repackaged under carbon dioxide at greater than atmospheric pressure, the reconstituted powders form a product containing bubbles or carbon dioxide.

Example 9

The procedure of Example 8 was repeated using orange juice powder. The same beneficial results were obtained as in Example 8.

Example 10

In this example powders obtained by drying grapefruit juice and orange juice were subjected to a vacuum of about one mm. Hg absolute pressure and the vacuum then immediately released to approximately 15 inches vacuum (38 cm. Hg absolute pressure) using carbon dioxide gas, after which the cans were closed. The packed cans were then stored at 70° F. for two weeks after which they were examined.

In this case there was some slight improvement in the milky appearance of the reconstituted product and in the amount of foam which formed subsequently. However, this treatment was not as effective as packaging in a carbon dioxide atmosphere following the preliminary equilibration period under vacuum (Example 8).

When the vacuum is held for a longer period of time prior to releasing it to 38 cm. Hg absolute pressure using carbon dioxide gas, the improvement increases.

It is a further advantage that our process can be applied to products other than those which either used or incorporated a foaming agent prior to drying. It is applicable to any powdered material which is to be reconstituted as a drink and which, in powder form, has a porous nature.

This includes freeze-dried materials, as well as certain types of spray or drum-dried materials.

This procedure can also be used to improve the appearance of any type food materials in liquid form or semi-liquid form, such as dried tea and coffee, soup mixes, gravy or sauce mixes, purees, and the like, as well as drinks which might form an undesirable foam upon addition of water or other liquid. The gas replacement technique of this process may be applied using any water soluble gas instead of the carbon dioxide referred to in Examples 8, 9, and 10. This includes sulfur dioxide, nitrous oxide, and various gaseous organic substances such as ethylene oxide and the like.

We claim:

1. A process for decreasing the milky appearance and the formation of air sols in a reconstituted aqueous fluid derived from a microscopic air bubble-containing dehydrated food product prepared by a foam-mat process and selected from the group consisting of oranges, lemons, grapefruit, pineapples, apples, tomatoes, prunes, tea, coffee, milk, carrots, soya beans, potatoes, sweetpotatoes, beans, berries, and pectin, which process comprises:
   (a) depositing said air bubble-containing dehydrated food product into an open container,
   (b) subjecting the open container with its contents to a vacuum ranging from about one mm. to about five mm. Hg absolute pressure,
   (c) maintaining said vaccum until a state of equilibrium is obtained,
   (d) sealing said container to maintain said equilibrium,
   (e) reopening the sealed container, and
   (f) thereafter reconstituting an aqueous fluid from the dehydrated product.

2. The process according to claim 1 wherein the reconstituted aqueous fluid is a juice.

3. The process according to claim 1 wherein the reconstituted aqueous fluid is a concentrate.

4. The process according to claim 1 wherein the reconstituted aqueous fluid is a puree.

5. The process according to claim 1 wherein the vacuum is maintained no longer than 72 hours prior to sealing the container.

6. The process according to claim 1 wherein the dehydrated food product is subjected to a warm-rolling treatment prior to being deposited into the container.

7. The process according to claim 1 wherein the dehydrated food product is a powder.

8. The process according to claim 1 wherein the dehydrated food product is a flake.

9. The process according to claim 1 wherein the dehydrated food product is a granule.

10. The process according to claim 7 wherein the powder has a particle size ranging from about 0.015 to about 0.025 inch.

11. The process according to claim 10 wherein the powder is subjected to a warm-rolling treatment prior to deposition into the container.

12. A process for decreasing the milky appearance and the formation of air sols in a reconstituted aqueous fluid derived from a microscopic air bubble-containing dehydrated food product prepared by a foam-mat process and selected from the group consisting of oranges, lemons, grapefruit, pineapples, apples, tomatoes, prunes, tea, coffee, milk, carrots, soya beans, potatoes, sweetpotatoes, beans, berries, and pectin, which process comprises:
   (a) depositing said air bubble-containing dehydrated food product into an open container,
   (b) subjecting the open container with its contents to a vacuum ranging from about one mm. to about five mm. Hg absolute pressure,
   (c) maintaining said vaccum until a state of equilibrium is obtained,
   (d) releasing said vacuum with a water-soluble gas selected from the group consisting of carbon dioxide, sulphur dioxide, nitrous oxide, and ethylene oxide, to give an absolute pressure ranging from about 38 cm. Hg to about 760 mm. Hg.
   (e) sealing said container to maintain said equilibrium,
   (f) reopening the sealed container, and
   (g) thereafter reconstituting an aqueous fluid from the dehydrated product.

13. The proces according to claim 12 wherein the water-soluble gas is carbon dioxide.

14. The process according to claim 12 wherein the reconstituted aqueous fluid is a juice.

15. The process according to claim 12 wherein the reconstituted aqueous fluid is a concentrate.

16. The process according to claim 12 wherein the reconstituted aqueous fluid is a puree.

17. The process according to claim 12 wherein the vacuum is maintained no longer than 72 hours prior to its release with a water soluble gas.

18. The process according to claim 12 wherein the dehydrated food product is subjected to a warm-rolling treatment prior to being deposited into the container.

19. The process according to claim 12 wherein the dehydrated food product is a powder.

20. The process according to claim 12 wherein the dehydrated food product is a granule.

21. The process according to claim 12 wherein the dehydated food product is a flake.

22. The process according to claim 19 wherein the powder has a particle size ranging from about 0.015 to 0.025 inch.

23. The process according to claim 22 wherein the powder is subjected to a warm-rolling treatment prior to being deposited into the container.

References Cited

UNITED STATES PATENTS

| | | | |
|---|---|---|---|
| 3,105,765 | 10/1963 | Creegan | 99—189 |
| 3,093,488 | 6/1963 | Graham et al. | 99—199 |
| 2,967,109 | 1/1961 | Morgan et al. | 99—199 |

OTHER REFERENCES

Tressler et al.: Fruit and Vegetable Juice Production, 1954, Avi Pub. Co., pp. 712–728.

RAYMOND N. JONES, *Primary Examiner.*

M. VOET, *Assistant Examiner.*